US005455598A

United States Patent [19]

Clerc

[11] Patent Number: 5,455,598

[45] Date of Patent: Oct. 3, 1995

[54] LIQUID CRYSTAL DISPLAY WITH ACTIVE MATRIX

[76] Inventor: Jean F. Clerc, D3, 681-12, Kogasaka, Machida-shi, Tokyo, Japan

[21] Appl. No.: 893,382

[22] Filed: Jun. 4, 1992

[30] Foreign Application Priority Data

Jun. 13, 1991 [JP] Japan .................................... 3-141845

[51] Int. Cl.[6] .................................. G02F 1/33; H04N 5/66

[52] U.S. Cl. .................................. 345/94; 345/92; 359/59

[58] Field of Search .................................... 340/784, 719, 340/805; 358/236; 359/59; 345/87, 90, 92, 94, 99, 100, 208; 348/790

[56] References Cited

U.S. PATENT DOCUMENTS

| | | | |
|---|---|---|---|
| 4,789,899 | 12/1988 | Takahashi et al. | 348/793 |
| 4,807,974 | 2/1989 | Hirai | 340/719 |
| 4,845,482 | 7/1989 | Howard et al. | 340/784 |
| 4,901,066 | 2/1990 | Kobayashi et al. | 340/784 |

FOREIGN PATENT DOCUMENTS

| | | | |
|---|---|---|---|
| 0090988 | 10/1983 | European Pat. Off. . | |
| 0313876 | 5/1989 | European Pat. Off. . | |
| 3702335A1 | 7/1987 | Germany . | |
| 57-109994 | 7/1982 | Japan . | |
| 0278033 | 11/1988 | Japan | 340/784 |
| 2175725 | 12/1986 | United Kingdom | 345/94 |

*Primary Examiner*—Tommy P. Chin
*Assistant Examiner*—Kara A. Farnandez

[57] ABSTRACT

An active matrix type liquid crystal display (LCD) having a thin film transistor for each liquid crystal cell, capable of decreasing attenuation off a video signal in each pixel. The active matrix type LCD has a number of liquid crystal pixels disposed in a matrix form each having a switching thin film transistor, a common drive unit for applying a row select signal to the gate of each of the switching thin film transistors of the liquid crystal pixels on the same row, and a segment drive unit for selectively applying one of the video signal and a constant bias signal to the source of each of the switching thin film transistors of the liquid crystal pixels on the same column.

5 Claims, 6 Drawing Sheets

LIQUID CRYSTAL DISPLAY WITH ACTIVE MATRIX

BACKGROUND OF THE INVENTION a) Field of the Invention

The present invention relates to a liquid crystal display (LCD), and more particularly to an active matrix type LCD wherein each liquid crystal cell has a switching thin film transistor.

b) Description of the Related Art

An LCD has a liquid crystal layer sandwiched between a pair of plates having electrodes. The state of liquid crystal molecules is controlled by voltage applied between two electrodes facing each other, to regulate light transmission.

For a large display screen, it is convenient that a number of pixels are disposed in the screen area in a matrix form and are driven by switching elements. To this end, an active matrix type LCD has been used in which row and column lines are wired in the screen area, and a thin film transistor is formed at each cross point between row and column lines to drive the pixel electrode.

For example, video information is supplied to a column driver having as many output lines as the number of columns, and a row driver is driven to sequentially scan row lines to supply video information one line after another.

A drive time period per one line is T/n, where n is the number of rows within one frame and T is one frame display time. The more the number of rows of a frame, the shorter the drive time period per each pixel. If a voltage built up within a pixel changes during an off-period of a switching or driver transistor, the quality of a displayed image will be degraded. In order to maintain a good image quality, some approaches have been proposed, for example, connecting a capacitor to each pixel.

SUMMARY OF THE INVENTION

It is an object of the present invention to provide an active matrix type liquid crystal display which poses no problem of attenuation of image signal at each pixel.

According to one aspect of the present invention, there is provided an active matrix type liquid crystal display comprising a number of liquid crystal pixels disposed in a matrix form each having a switching thin film transistor, a common drive unit for applying a row select signal to the gate of each of the switching thin film transistors of the liquid crystal pixels on the same row, and a segment drive unit for selectively applying one of the video signal and a constant bias signal to the Source of each of the switching thin film transistors of the liquid crystal pixels on the same column.

It is preferable that the low select signal takes a level "1" for each row select time, thereafter takes a level "0" at least one row select time, and during each of the following row select time periods, takes the level "1" for a fraction of the row select time and the level "0" for the remaining fraction.

A constant bias signal is applied to the liquid crystal pixel after the video signal was applied. Therefore, attenuation of the video signal becomes negligibly small.

The row select signal may be repetitively applied during each frame period, to thereby hold the voltage applied to the pixel substantially to a constant bias voltage.

By not applying the row select signal for a predetermined time period after the video signal was applied, it is possible to elongate the time period for holding the video signal in each pixel to a desired value.

In this manner, irregularity of liquid crystal display characteristics to be caused by conductivity of the liquid crystal material can be suppressed.

Figure 2A:
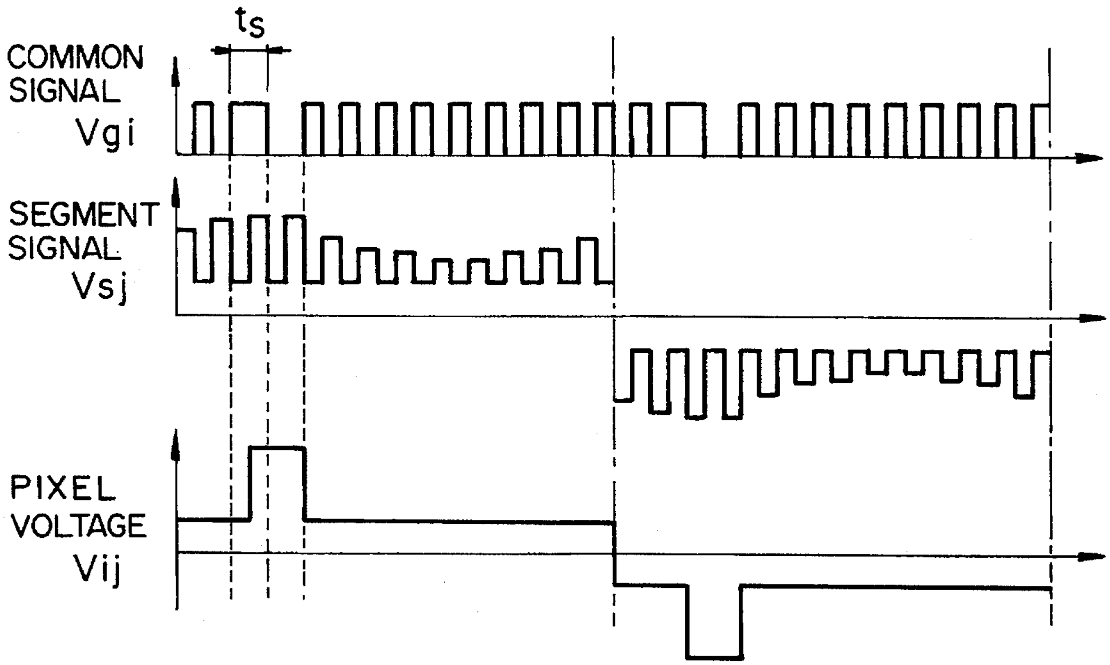
FIGS. 2A and 2B show waveforms of a common signal, segment signal and pixel voltage, at selected circuit portions of an active matrix type LCD according to other embodiments of the present invention.
Figure 2B:
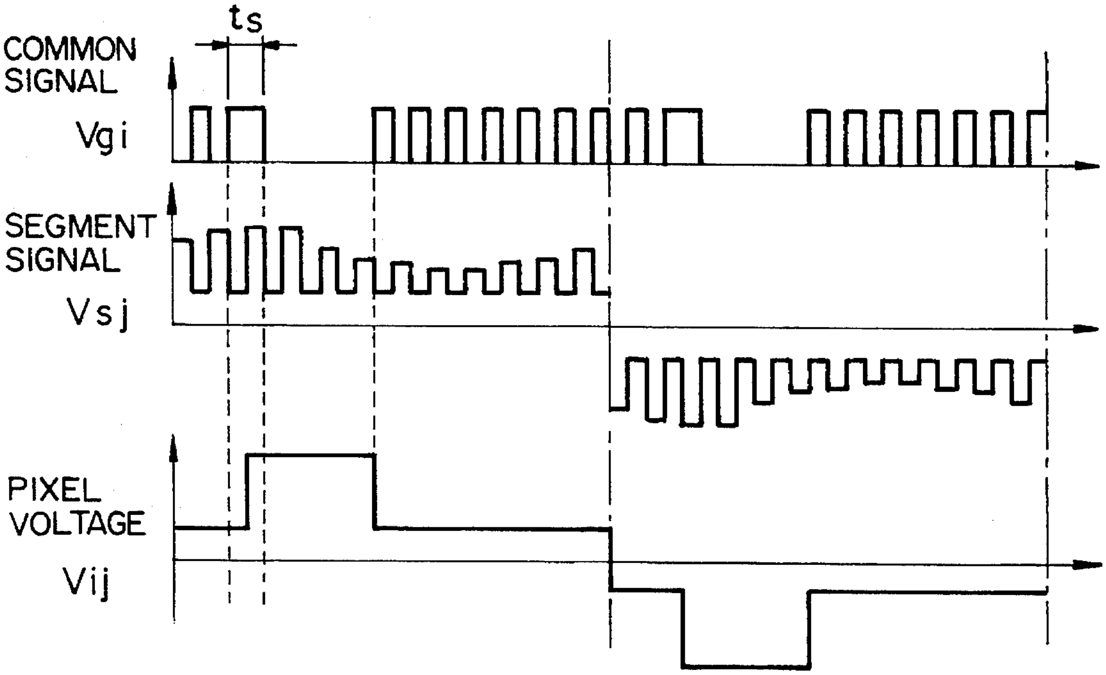

FIG .3 is a block diagram of a common drive unit capable of generating the common signal shown in FIGS. 2A and 2B.

Figure 4A:
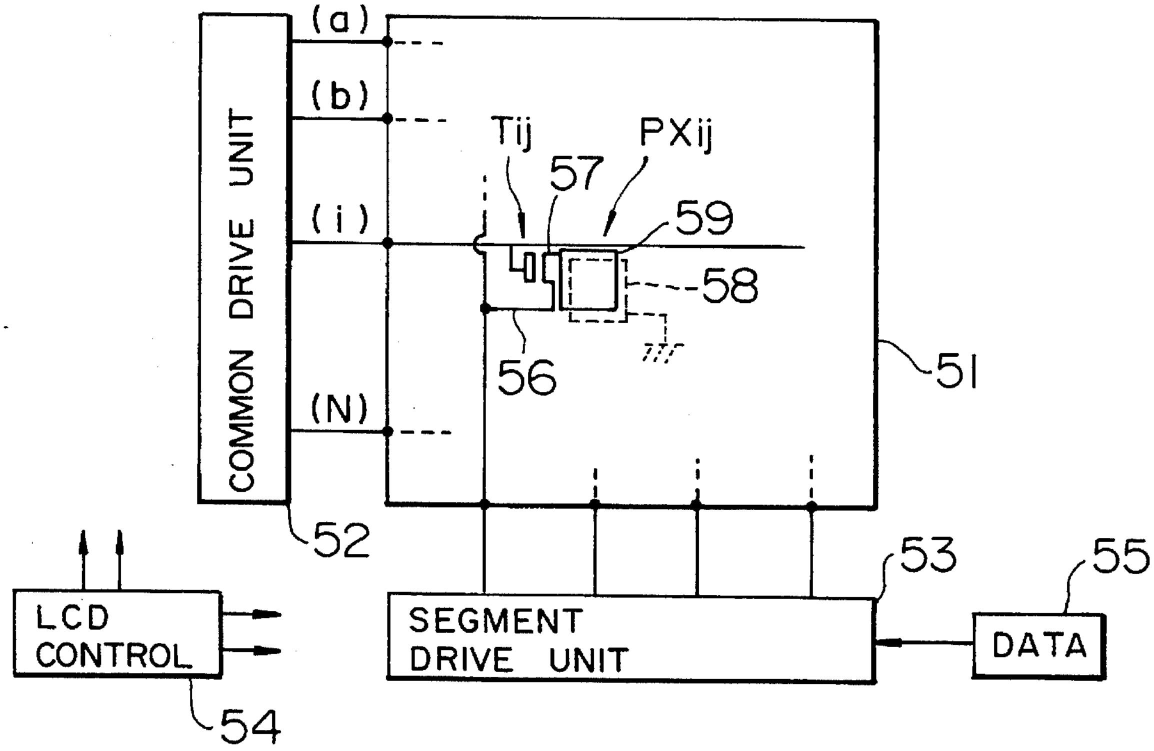
Figure 4B:
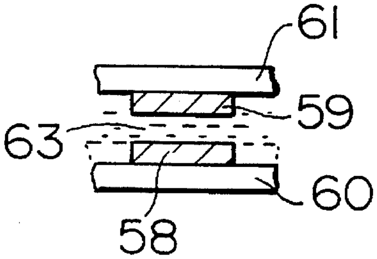

FIGS. 4A and 4B show the circuit arrangement of an active matrix type LCD and the structure of one pixel, respectively.

Figure 5:
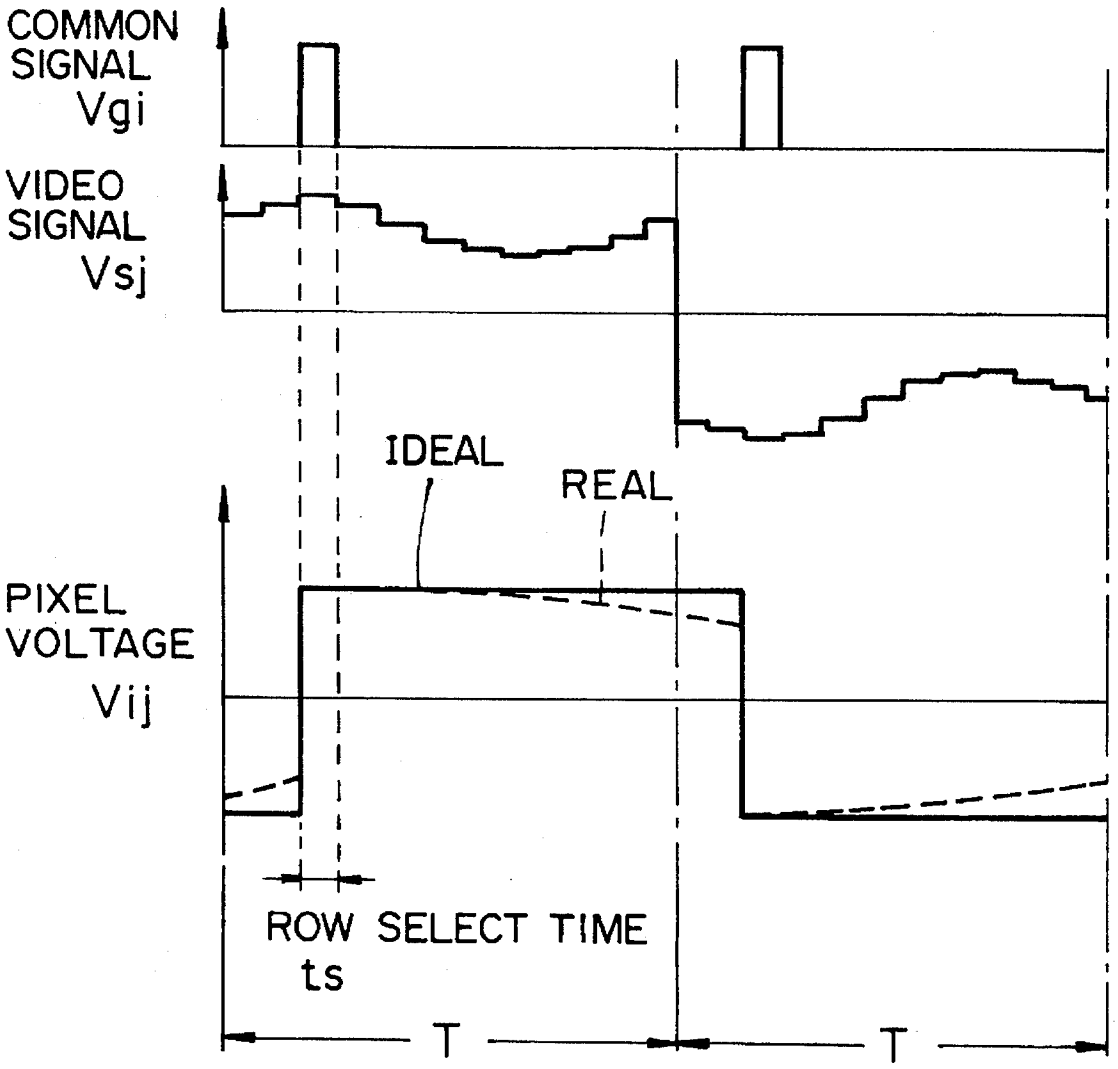
FIG. 5 (PRIOR ART)

FIG. 5 shows waveforms at main circuit portions of a conventional active matrix type LCD circuit.

Figures 6A, 6B, 6C, 6D:
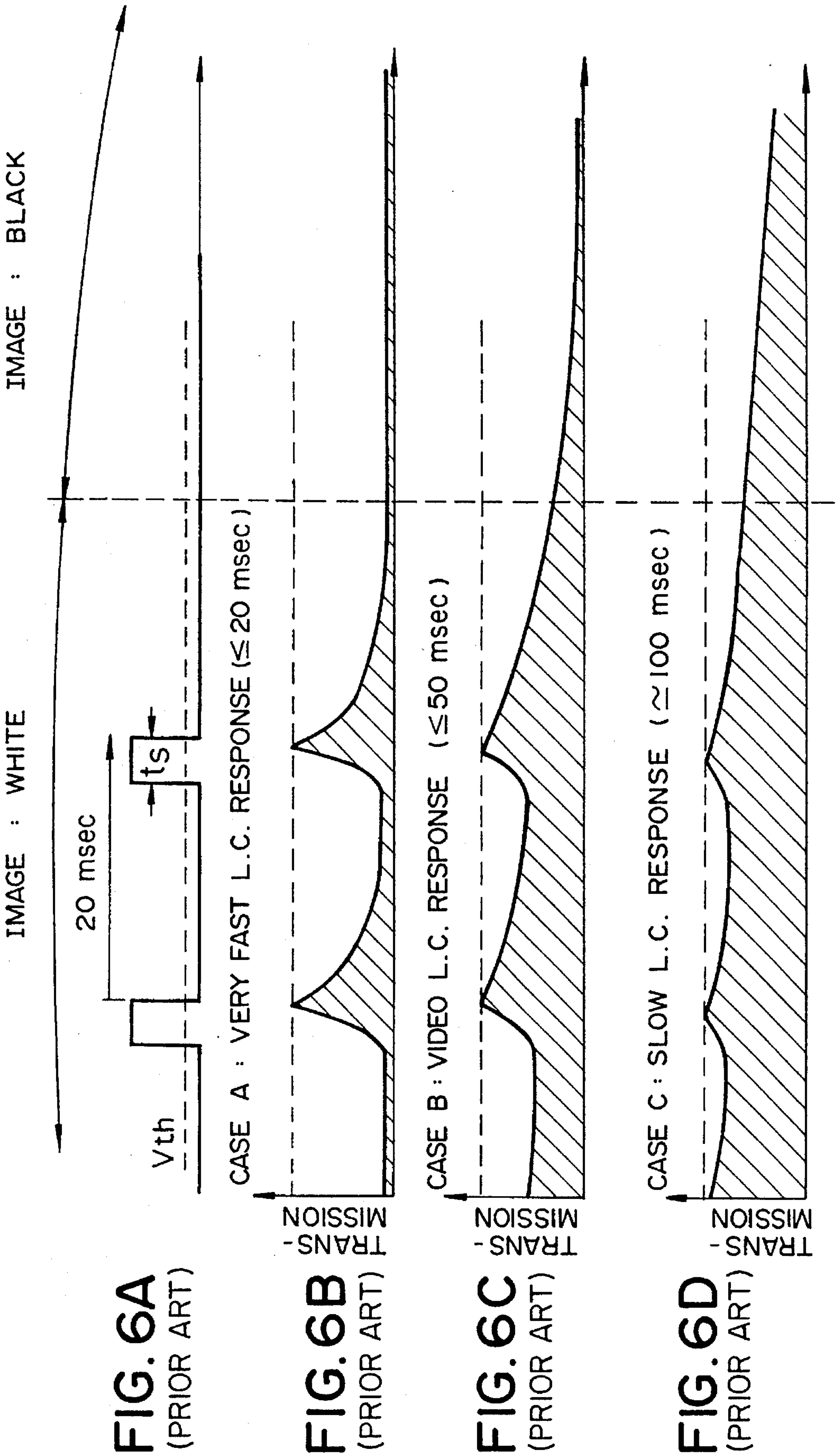
FIG. 6A (PRIOR ART)
FIG. 6B (PRIOR ART)
FIG. 6C (PRIOR ART)
FIG. 6D (PRIOR ART)

FIGS. 6A to 6D are graphs explaining the liquid crystal response characteristics, FIG. 6A shows an applied voltage changing with time, FIG. 6B shows a light transmission changing with time of liquid crystal having a very fast response speed, FIG. 6C shows a light transmission changing with time of liquid crystal having a video-level response speed, and FIG. 6C shows a light transmission changing with time off liquid crystal having a slow response speed.

DETAILED DESCRIPTION OF THE EMBODIMENTS

First, the structure and operation of a general active matrix type LCD will be described.

The structure of an active matrix type LCD is briefly shown in FIGS. 4A and 4B. A number of pixels (picture elements) PXij are disposed on a glass substrate 61 in a matrix form within a display area 51. As shown in FIG. 4B, at each pixel Pxij, a liquid crystal layer 63 is sandwiched between a pixel electrode 59 formed on the substrate 61 and a counter electrode 58 formed on another substrate 60, the counter electrode 58 being supplied with a reference potential such as ground potential. The source electrode 56 off a transistor Tij is connected to a j-th segment line, and the gate electrode thereof is connected to an i-th common line. Each common line is driven by a common drive unit 52 to sequentially select a row. Each segment line is driven by a segment drive unit 58 to which a video signal is supplied from a data supply unit 55. The segment drive unit 53 supplies the inputted video signal to pixels PX via transistors connected to the common line driven by the common drive unit 52. The common drive unit 52 and segment drive unit 53 are controlled by various control signals supplied from a control unit 54.

Signal waveforms of an LCD drive circuit according to the prior art are shown in FIG. 5 for the purpose of comparison.

A waveform at the uppermost diagram in FIG. 5 shows a common signal Vgi applied to one common line. The common signal Vgi is a gate signal supplied to the i-th common line, and takes a level "1" during a row select time while the i-th row is selected, and a level "0" during the other period. If the number of common lines is 400, the row select time $t_s$ is (1/400) * (one frame time). When the common signal on the i-th common line changes from "1" to "0", the common signal on the next (i+1)-th line Changes from "0" to "1" to select the next row.

A waveform at the middle diagram in FIG. 5 shows a video signal Vsj. This video signal is applied to the i-th segment Line. The video signal for the i-th row pixel is indicated in FIG. 5 as defined between the row select time $t_s$.

The video signal for one column shown in the left half of FIG. 5 is sequentially supplied to pixels of one column of the display area 511shown in FIG. 4. Each time a frame changes, the polarity of the video signal is inverted as shown in the right half of FIG. 5.

A voltage waveform applied to one pixel is shown at the lowermost diagram of FIG. 5. The voltage Vij at the pixel electrode 59 off a pixel PXij during one frame period is dependent upon the voltage initially supplied from the drive transistor when the i-th row is selected. The transistor turns off when the next row is selected, and the pixel electrode is electrically disconnected from the segment line until the same row is selected again at the next frame. The counter electrode 58, pixel electrode 59, and liquid crystal layer 63 sandwiched therebetween, constitute a capacitor. If this capacitor has perfect insulation, the stored voltage will not change until the next selection of the same row. Such an ideal waveform is indicated by a solid line in the lowermost diagram of FIG. 5. However, some Leak current flows in practice. For example, an applied voltage causes ions existing within the liquid crystal to move toward the surfaces of the liquid crystal layer and store charges at the surfaces. These ions have such polarities that electric charges on the capacitor electrodes are canceled. As a result, the amount of stored electric charges reduces, lowering an effective voltage across the liquid crystal. A broken line in the lowermost diagram of FIG. 5 indicates such an effective or real voltage waveform.

The electrical characteristics of the liquid crystal of a liquid crystal panel are not uniform. Therefore, the effective pixel voltage given in the lowermost diagram of FIG. 5 will not change in a uniform manner, resulting in an irregular display image.

If irregularity of the stored voltage change at each pixel is suppressed, the image quality can be improved. In the following, an LCD circuit will be described which can suppress irregularity of the stored voltage change at each pixel.

One frame period of an active matrix type LCD is generally about 20 msec. If the number of scan lines is 400, a select time per one row is about 50 μsec. In order that electric charges accumulated during about 50 μsec are to be held during 20 msec, it is necessary to take into consideration a problem of attenuation of the stored voltage to be caused by leak current through the liquid crystal layer. Such attenuation of the stored voltage poses no problem if the accumulation time period is in the order of several hundreds μsec for example.

A response of liquid crystal molecules to an applied voltage is not always very fast. FIGS. 6A to 6D show three typical types of responses of liquid crystal to an applied voltage pulse. It is assumed that as shown in FIG. 6A, a voltage above a threshold value is applied to a liquid crystal cell without providing an additional capacitor, during a row select time at an interval of 20 msec. It is also assumed that a transmission Factor of the liquid crystal cell becomes high as liquid crystal molecules are re-oriented by the applied voltage pulse.

FIGS. 6B to 6D show examples of a very fast response, video-level response and slow response, respectively. The very fast response shown in FIG. 6B has a response time 20 msec or faster. In this case, even if the light transmission becomes high to some value upon reception of an applied voltage above a threshold value during a row select time, it becomes almost zero at the next row select time (after about 20 msec).

FIG. 6C shows the video-level response having a time constant longer than 20 msec and shorter than 50 msec. in this case, although the light transmission once risen becomes lower after about 20 msec, it still has a value not zero, e.g., about half the initial transmission.

FIG. 6D shows the slow response having a time constant of about 100 msec. In this case, the light transmission once risen does not become lower or attenuate so much after about 20 msec, but it remains almost the same as the initial transmission, e.g., about 20% attenuation.

According to the present invention, after a video signal is stored in a pixel and held for a predetermined period, in place of the video signal a signal of a predetermined voltage is repetitively applied to the pixel to obtain a desired one-frame averaged voltage level of a display image. This drive method is effective particularly for the above-described video-level response of liquid crystal. To this end, a video signal and a constant bias signal are adapted to be selectively applied to the segment line. For example, the video signal and constant bias signal are alternately applied to each segment line.

Figure 1A:
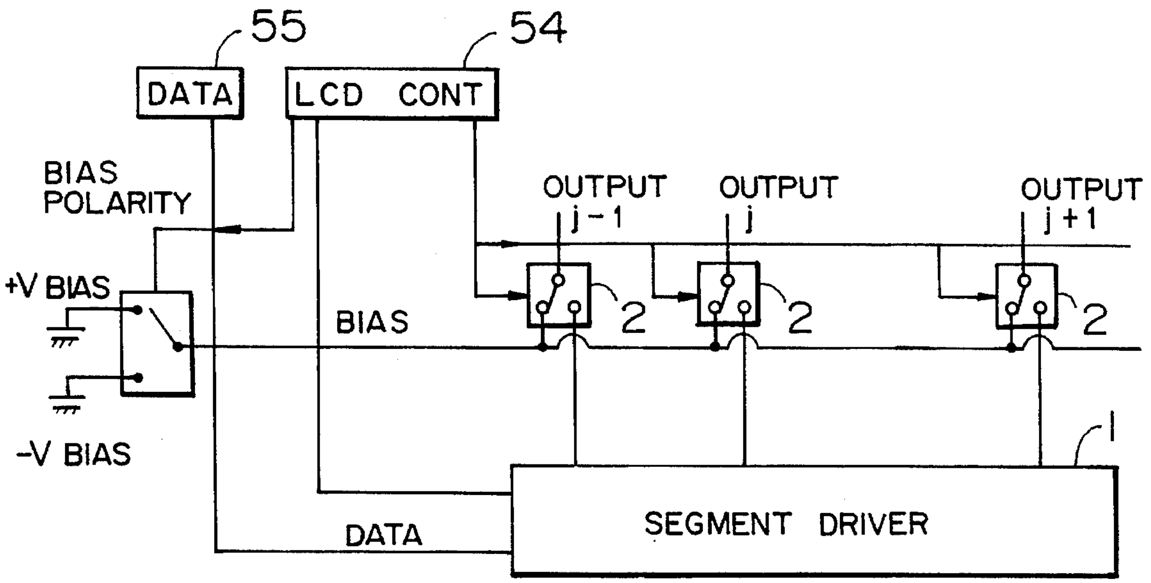
FIGS. 1A is a block diagram showing a segment drive unit of an active matrix type LCD according to an embodiment of the present invention.
Figure 1B:
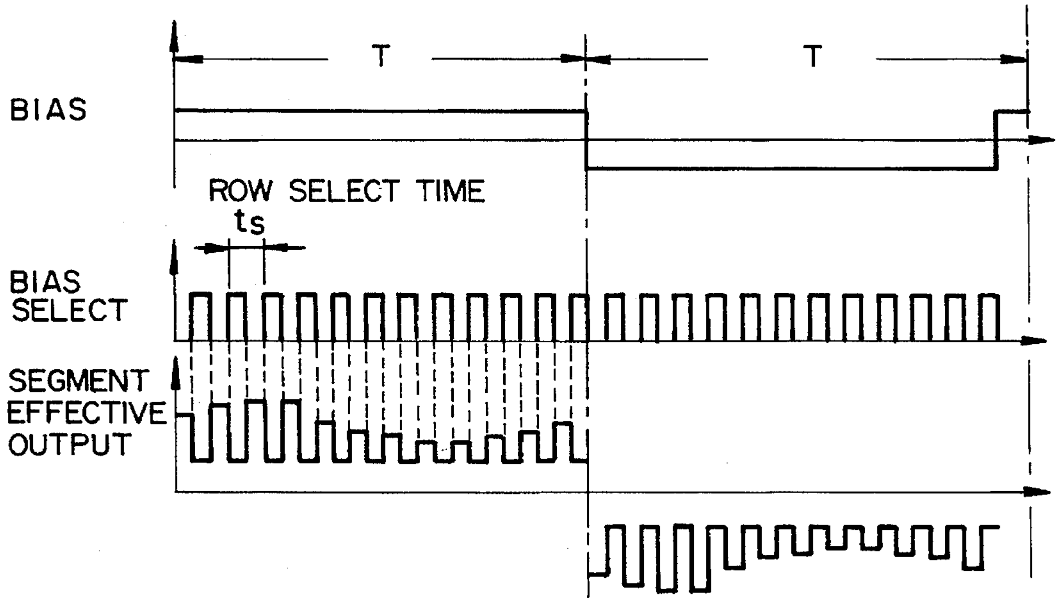
FIG. 1B shows waveforms at main circuit portions of the segment drive unit shown in FIG. 1A.

FIG. 1A is a block diagram showing the structure of a segment driver unit including a segment driver similar to a conventional one for carrying out such a drive method. FIG. 1B shows signal waveforms at main circuit portions of the segment driver unit. The segment driver 1 includes a shift register for example, which sequentially stores the video signal of one row and outputs them in parallel. This segment driver 1 has the same structure as a conventional segment driver. The segment driver 1 receives a video signal (data), horizontal synchronizing signal and clock signal, and outputs the video signal corresponding to a selected row to respective segment lines.

An analog switch 2 is connected to each video output terminal of the segment driver 1, the number of video output terminals being equal to that of segment lines. A video signal is applied to one input terminal of each analog switch 2, and a constant voltage bias signal is applied to the other input terminal. An effective output line is connected to the output of each analog switch 2. Under control by a bias select signal, the analog switch 2 selectively outputs either the video signal or the bias voltage signal, to the effective output line. Specifically, when the bias select signal is supplied, the analog switch 2 selects the bias voltage signal in place of the video signal, and outputs it to the effective output line.

The uppermost diagram of FIG. 1B shows a waveform of the bias signal. This bias signal takes a constant value during one frame period, and inverts its polarity at the next frame period. The absolute value of the bias signal is the same.

The bias select signal at the middle diagram of FIG. 1B is made of a number of pulses, the period of which corresponds to the row select time $t_s$. In the case shown in FIG. 1B, the bias select signal takes a level "0" during the first half of each row select time, and takes a level "1" during the second half. When the bias select signal takes level "0", the video signal is selected, and when it takes level "1", the bias signal is selected.

As shown in the lowermost diagram of FIG. 1B, the effective output voltage outputted from each analog switch 2 takes the level of the video signal during the first half of each row select time, and takes the level of the bias voltage signal during the second half. The effective output voltage shown in the lowermost diagram of FIG. 1B is therefore supplied to the source electrode of the transistor connected to each pixel.

The ratio of the video signal period to the bias voltage signal period during each row select time is not so important. It is however preferable to set the ratio to 1:1 (duty ratio of ½) if the transistor operation speed is high. It is also preferable to set the ratio to such as 2:1 and 3:1 with a longer video signal (data) period, if the transistor speed is not sufficiently high. It is not desirous that a transistor having a slow operation speed is used intentionally.

If a common drive unit on the row side is used which has the same structure as a conventional common drive unit, each row is supplied with the common signal such as shown in the uppermost diagram of FIG. 5. The common signal takes level "1" during its row select time to turn on the transistor, and takes level "0" during the other period to turn off the transistor. During the first half of the row select time (while the common signal takes level "1"), the video signal is supplied, and during the second half the bias voltage signal is supplied.

In this case, the time period while the image signal is applied to a pixel is a fraction of the row select time. It is also possible, however, to elongate the period while the video signal is applied, by slightly changing the common drive unit.

FIGS. 2A and 2B show waveforms illustrating how the video signal application period is made longer than the row select time.

Figure 3:
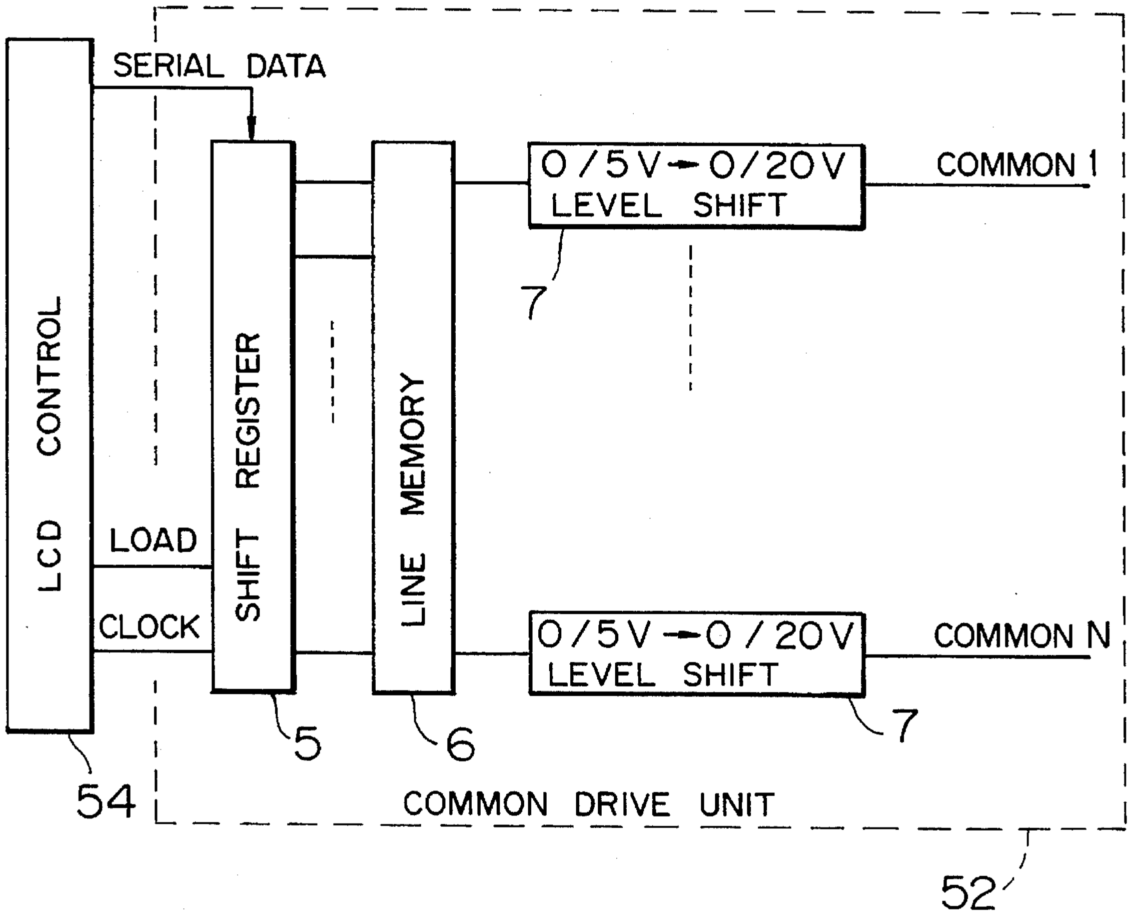

An example of the circuit arrangement of the common drive unit is shown in FIG. 3. An LCD control unit 54 generates a base clock signal, a load signal and serial data signal made by a combinational logic circuit of a loop counter having the same number of steps to that of rows, a decoder and a latch. Thus, the LCD controller sequentially outputs serial data shifting the row to be driven, synchronously with a base clock signal. The serial data supplied from the LCD control unit 54 is triggered by the edge of the clock signal, and sequentially shifted within a shift register 5. After a set of serial data is set in the shift register 5, all the data are transferred at the same time, triggered by the edge of the load signal, from the shift register 5 to a line memory 6. The data in the line memory 6 has a potential level 0/5 V of usual logic circuits, for example. Since a higher level voltage is generally used by LCD circuits, a level shifter 7 shifts the voltage level to a desired level. In this manner, the common signal supplied to each gate is formed.

Referring now to FIG. 2A, the common signal Vgi applied to the i-th common line takes level "1" during its row select time, and takes level "0" during the next row select time. During each of the other row select time periods, it takes level "1" during a fraction of each row select time, and takes "0" during the remaining fraction.

The segment signal Vsj applied to the j-th segment line and shown in the middle diagram of FIG. 2A is similar to the effective output signal shown in tile lowermost diagram in FIG. 1B.

As the common signal is applied to the gate of each transistor and the segment signal is applied to the source, the transistor turns on during the row select time starting from the time when the common signal rises. As a result, the segment signal is supplied to the pixel or liquid crystal electrode connected to the drain, causing the pixel voltage to follow the segment signal voltage. Namely, the pixel voltage first takes the bias signal voltage and then the video signal voltage. After elapse of the row select time, the common signal Vgi takes level "0" during the next row select time to turn off the transistor. The time period while the pixel voltage is held, is a total of one bias non-select time and one row select time. If the bias select signal has a duty ratio of 0.5, this period is 1.5 row select times.

During each of the other row select time periods, the common signal takes level "1" during the period while the segment signal is set to the bias voltage. The pixel is accordingly charged to this bias voltage. This operation is repetitively carried out. When the frame changes, the segment signal and hence pixel voltage is inverted.

If the liquid crystal response is the video-level response shown in FIG. 6C or the slow response shown in FIG. 6D, it is conceivable that the effect of an applied voltage continues to be maintained not only during the video signal voltage application period but also during the following period inclusive at least one frame period.

in such a case, a mean square value of the pixel voltage, in terms of an effective power, is given by the following equation, assuming that the number of row lines is 400 and the time period while the pixel voltage is held, is 1.5 row select times:

$$Vij=\{(.5/400) * (\text{video voltage})^2+ (.5/400) * (\text{bias voltage})2)^2\}^{1/2}$$

It is assumed that the video voltage changes from 0 V corresponding to a darkest state to 20 V for example corresponding to a brightest state. The bias voltage is assumed to be set to a value slightly smaller than the liquid crystal threshold voltage, e.g., 1 V. Then, the mean square voltage value for the brightest state is:

$$Vij\ (ON)=\{(.5/400) * (20)^2+(.5/400) * (1)^2\}^{1/2} \cong 1.58\ V,$$

and the mean square voltage value for the darkest state is:

$$Vij(OFF) = \{(1.5/400) * (0)^2 + (398.5/400) * (\text{bias voltage})^2\}1/2 = \{(398.5/400) * (1)^2\}1/2 - 1\ V.$$

A voltage ratio is therefore:

$$Vij(ON)/Vij(OFF) \cong .58$$

FIG. 2B shows waveforms for the case where the time period while the pixel video signal is held, is made longer. The uppermost diagram of FIG. 2B shows the i-th common signal Vgi, the middle diagram shows the i-th segment signal Vsj, and the lowermost diagram shows the pixel voltage Vij. With this arrangement, the common signal is set to level "0" during 3 row select time periods after the row select time. Accordingly, the video signal stored in the pixel is held during the following 3 row select time periods. Adding this time period to the one bias non-select time (half the row select time for the duty ratio 0.5) results in 3.5 row select time period in total, during which the pixel video signal is held. The other operation is similar to the case shown in FIG. 2A.

In this case shown in FIG. 2B, a mean square pixel voltage value is given by:

$$Vij= \{(.5/400) * (\text{video voltage})^2 +(.5/400) * (\text{bias voltage})^2\}^{1/2}$$

Similar to the above-described case, it is assumed that the video voltage changes from 0 V corresponding to a darkest state to 20 V for example corresponding to a brightest state bias voltage is assumed to be set to a value slightly smaller than the liquid crystal threshold voltage, e.g., 1 V. Then, the following results are obtained:

$$Vij\ (ON)=\{(.5/400) * (20)^2+(.5/400) * (1)^2\}^{1/2} \cong 2.11\ V$$

$$Vij\ (OFF)=\{(.5/400) * (0)^2+(.5/400) * (1)^2\}^{1/2} \cong 1\ V Vij(ON)/Vij(OFF)=.11$$

Generally, if the voltage ratio of the mean square voltage for OFF state to that for ON state is 1.5 or more, a proper drive can be realized. From this point of view, the above-described two cases provide an image display having a sufficient contrast.

the liquid crystal response is very fast, the precision of the above-described approximation becomes bad. However, this approximation can be fixed at least qualitatively to some extent. It is most preferable to use a liquid crystal cell having a video-level response speed.

An attenuation of a stored video signal voltage is dependent upon the time period for holding it. Representing the time constant of a discharge circuit of possible liquid crystal leakage by trc, a pixel voltage change ΔV1c can be given by:

$$\Delta V1c=-V1e * \{1-\exp(-t/t_{rc})\}$$

Assuming that $t_{rc}$=50 msec, frame time=20 msec, and row select time=20 msec/400=50 μsec, the pixel voltage change according to the prior art is given by:

$$\Delta V1c=-V1c * \{1-\exp(-20\ msec/50\ msec)\} \cong -V1c * .32,$$

resulting in about −32% attenuation.

In the ease shown in FIG. 2A, the video signal is attenuated only during the 1.5 row select time period, i.e., about 75 μsec. The pixel voltage change is therefore given by:

$$\Delta Vlc=-Vlc * \{1-\exp(-75\ \mu sec/50\ msec)\} \cong -Vlc * .0014,$$

resulting in only about −0.14% attenuation.

In the case shown in FIG. 2B, the video signal is attenuated during the 3.5 row select time period, i.e., about 175 μsec. The pixel voltage change is therefore given by:

$$\Delta VlC=-Vlc * \{1-\exp(-175\ \mu sec/50\ msec)\} \cong Vlc * .0034,$$

resulting in about −0.34% attenuation.

As described above, by limiting the time period for holding the video signal, attenuation of the video signal voltage caused by conductivity of the liquid crystal can be made negligible. Even if the temperature of a liquid crystal panel rises and the conductivity becomes high, or irregularity of the characteristics of the panel becomes great, attenuation of the video signal voltage can be made negligible.

The present invention has been described in connection with the preferred embodiments. The present invention is not intended to be limited only to the embodiments, but it is apparent for those skilled in the art that various modifications, improvements, combinations and the like are possible.

I claim:

1. An active matrix type liquid crystal display comprising:

a plurality of liquid crystal pixels disposed in a matrix form between a pair of plates formed with electrodes, each said liquid crystal pixel including a switching thin film transistor, said liquid crystal pixels being arranged in rows and columns;

common drive means for applying a row select signal to a gate of each said switching thin film transistor of said liquid crystal pixels disposed in a same row; and segment drive means for alternately applying as a segment signal, a video signal or a constant bias signal, to a source of each said switching thin film transistor of said liquid crystal pixels disposed in a same column;

wherein a row select time in which one row is selected in sequential scanning of rows by said common drive means is divided into a first select time and a second select time following said first select time, and said alternately applied constant bias signal and video signal change synchronously with said first and second select times;

wherein said segment signal is said constant bias signal during said first select time, and said segment signal is said video signal during said second select time; and wherein said row select signal applied to the same row in each frame time has a level "1" for selecting the same row, thereafter has a level "0" for at least one row select time, and during each of the following row select time periods, said row select signal repetitively has the level "1" during said first select time and has the level "0" during the second select time for a plurality of first and second select times.

2. An active matrix type liquid crystal display according to claim 1, wherein said segment drive means includes:

first drive means for supplying said video signal for one row synchronously with each said row select time, and switching means for selecting one of said constant bias signal and said video signal of said first drive means.

3. An active matrix type liquid crystal display according to claim 1, wherein said constant bias signal is slightly smaller than a threshold value of each said pixel.

4. An active matrix type liquid crystal display according to claim 1, wherein said common drive means includes means for supplying said row select signal changing twice during each said row select time.

5. An active matrix type liquid crystal display according to claim 4, wherein said common drive means further includes level shift means for changing a voltage level of said row select signal.

* * * * *

UNITED STATES PATENT AND TRADEMARK OFFICE

CERTIFICATE OF CORRECTION

PATENT NO. : 5,455,598

DATED : October 3, 1995

INVENTOR(S) : CLERC

It is certified that error appears in the above-indentified patent and that said Letters Patent is hereby corrected as shown below:

On the title page, item [73] Assignee, insert:

-- Assignee: Stanley Electric Co., Ltd. Tokyo, Japan--

Signed and Sealed this

Fifth Day of November, 1996

Attest:

BRUCE LEHMAN

*Attesting Officer* *Commissioner of Patents and Trademarks*